(12) United States Patent
Ando

(10) Patent No.: US 7,028,706 B2
(45) Date of Patent: Apr. 18, 2006

(54) GAS DECOMPRESSION DEVICE FOR FUEL CELL SYSTEM

(75) Inventor: Akira Ando, Obu (JP)

(73) Assignee: Aisan Kogyo Kabushiki Kaisha, Obu (JP)

( * ) Notice: Subject to any disclaimer, the term of this patent is extended or adjusted under 35 U.S.C. 154(b) by 118 days.

(21) Appl. No.: 10/814,170

(22) Filed: Apr. 1, 2004

(65) Prior Publication Data

US 2004/0206400 A1 Oct. 21, 2004

(30) Foreign Application Priority Data

Apr. 21, 2003 (JP) .............................. 2003-115192

(51) Int. Cl.
*G05D 7/06* (2006.01)
*G05D 16/20* (2006.01)
*H01M 8/04* (2006.01)

(52) U.S. Cl. .................. 137/487.5; 137/495; 137/510; 429/25; 429/34

(58) Field of Classification Search ............ 137/487.5, 137/495, 510; 429/22, 25, 34
See application file for complete search history.

(56) References Cited

U.S. PATENT DOCUMENTS 3,364,070 A * 1/1968 Alexander .................. 429/25
3,505,119 A * 4/1970 Gillespie ..................... 429/25
4,203,465 A * 5/1980 Rissi ........................ 137/487.5

FOREIGN PATENT DOCUMENTS

| FR | 2 712 099 A1 | * | 5/1995 |
| JP | 11-082780 | * | 3/1999 |
| JP | A 2002-373682 | | 12/2002 |
| JP | 2003-068334 | * | 3/2003 |
| WO | WO 00/36482 | * | 6/2000 |
| WO | WO 01/59537 | * | 8/2001 |

* cited by examiner

*Primary Examiner*—Ramesh Krishnamurthy
(74) *Attorney, Agent, or Firm*—Oliff & Berridge, PLC

(57) ABSTRACT

A decompression valve incorporated in a gas decompression device valve of fuel cell system is divided into a measuring room and a back pressure room by a diaphragm. A valve seat and a valve body adjoining to the measuring room are arranged on the decompression valve. When gas pressure works on the diaphragm, the diaphragm is displaced to move in a direction for making the valve body closer to the valve seat. Pressure control springs arranged on the decompression valve urge the diaphragm in a direction to make the valve body separate from the valve seat. The diaphragm, pressure control springs and the like allow hydrogen gas to pass the valve seat, whereby hydrogen gas from an outlet is decompressed. The gas decompression further comprises a pressure switch valve which adjusts urging force of the pressure control spring by back pressure, a flow rate sensor which detects gas flow rate at the outlet, and an electronic control unit which controls the pressure switch valve so as to adjust back pressure depending on gas flow rate.

9 Claims, 7 Drawing Sheets

US 7,028,706 B2

GAS DECOMPRESSION DEVICE FOR FUEL CELL SYSTEM

BACKGROUND OF THE INVENTION

1. Field of the Invention

The present invention relates to a gas decompression device for fuel cell system which is used for decompressing fuel gas or oxidizing gas supplied to a fuel cell in fuel cell system.

2. Description of Related Art

JP Laid-open Patent Publication No. 2002-373682 (pp. 3–6, FIG. 1 and FIG. 2) discloses a conventional gas decompression device. Fuel cell system disclosed in No. 2002-373682 employs a regulator for reducing pressure of fuel gas (hydrogen gas) supplied to a fuel cell depending on pressure of air supplied to the fuel cell. The regulator comprises a pneumatic proportional pressure control valve wherein air supplied from an air compressor to a fuel cell is used, and a pressure signal of the supplied air is inputted so that pressure of hydrogen gas at an outlet (outlet pressure) should be reduced to a predetermined range of pressure depending on the pressure signal. Generally, this type of regulator has a diaphragm connected to a valve body and a spring such as pressure control spring and adjusts gas pressure by regulating opening of the valve body wherein resultant force of force on the diaphragm by gas and urging force of the spring is balanced.

In the conventional regulator, load of the pressure control spring changes depending on displacement of the valve body (displacement of the diaphragm). As a result, outlet pressure changes accordingly. That is, when the diaphragm is displaced, the spring is transformed and urging force of the spring is changed in accordance with a spring constant. As shown in FIG. 9, direction of action is opposite to each other between gas pressure on the diaphragm and urging force of the pressure control spring, however, those forces decline as gas flow rate (opening of the valve body) increases. Therefore, as shown in FIG. 10, outlet pressure declines as gas flow rate (opening of the valve body) increases. Primarily, it is desirable that outlet pressure of a regulator for fuel cell system be constant irrespectively of large/small of gas flow rate. However, the conventional regulator cannot evade influence of a spring constant, and its outlet pressure declines in case large amount of hydrogen gas flows into the regulator.

Furthermore, in the conventional fuel cell system, pressure of air supplied from the air compressor to the regulator changes following up flow rate of air supplied from the air compressor to the fuel cell. Therefore, air pressure needed for the regulator cannot be supplied to the regulator separately. As a result, it is difficult to adjust outlet pressure of hydrogen gas in the regulator as desired.

Furthermore, a stop of the fuel cell system makes the valve body of the regulator enclosed completely, whereby, as shown in FIG. 10, outlet pressure obtained when gas flow rate is "0" becomes high. Therefore, there has been required pressure proof design to thicken devices to be arranged at the downstream side of the regulator. Such pressure proof design makes the entirety of a device grow in size and period of endurance tends to be shortened.

SUMMARY OF THE INVENTION

Accordingly, the present invention has been made to resolve problems described in the above. It is a primary object of the present invention to provide a decompression device for fuel cell system capable of making gas pressure supplied to a fuel cell constant. In addition to the primary object, a secondary object of the present invention is to provide a decompression device for fuel cell system capable of declining gas pressure acting on a fuel cell when fuel cell system is stopped.

According to one aspect of the present invention, there is provided A gas decompression device which decompresses gas to be supplied to a fuel cell in fuel cell system, the gas decompression device comprising: a body which includes an inlet, an outlet, and an internal space; a diaphragm which divides the internal space into a measuring room and a back pressure room; a valve seat which is provided for the measuring room and arranged between the inlet and the outlet; a valve body which is provided for the valve seat and interlocked with the diaphragm; working pressure supply means which supplies working pressure to the back pressure room; a pressure control spring which urges the diaphragm in a direction to make the valve body separate from the valve seat; working pressure adjust means which adjusts working pressure to be supplied to the back pressure room; gas flow rate detect means which detects flow rate of gas from the outlet or a value corresponding to the flow rate; and control means which controls the working pressure adjust means so as to adjust the working pressure depending on the flow rate or the value corresponding to flow rate detected by the gas flow rate detect means, wherein the diaphragm is displaced in a direction to make the valve body come close to the valve seat when gas pressure works on the measuring room side of the diaphragm, the diaphragm is displaced in a direction to make the valve body separate from the valve seat when working pressure works on the back pressure room side of the diaphragm, and gas flowing in the measuring room through the inlet and out from the outlet is decompressed by such that collaboration of at least the diaphragm and the pressure control spring makes the valve body move with reference to the valve seat.

In the gas decompression device directed to one aspect of the present invention, the diaphragm is displaced in a direction to make the valve body come close to the valve seat when gas pressure works on the measuring room side of the diaphragm. On the other hand, working pressure is supplied to the back pressure room by the working pressure supply means. The diaphragm is displaced in a direction to make the valve body separate from the valve seat when the working pressure works on the back pressure room side of the diaphragm. Similarly, urging force of the pressure control spring urges the diaphragm in a direction to make the valve body separate from the valve seat. Those forces, namely, working pressure, gas pressure and urging force, are balanced and make the diaphragm displaced, whereby a distance from the valve seat to the valve body, i.e., opening of the valve body is determined. As the opening becomes larger, the pressure control spring is transformed more and urging force of the pressure control spring lowers in proportion to its spring constant, which results in lowering of gas pressure at the outlet working on the diaphragm. The larger the opening of the valve body becomes, the more flow rate of gas flowing out from the outlet becomes. Flow rate or a value corresponding to flow rate is detected by the gas flow rate detect means. The working pressure adjust means is controlled by the control means depending on a detected value, whereby working pressure given to the diaphragm is adjusted. Accordingly, a force working in a direction same as urging force direction of the pressure control spring is adjusted and given to the diaphragm, whereby force on the diaphragm kept constant and gas pressure at the outlet becomes constant.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

There will be described an embodiment of the inventive gas decompression device for fuel cell system by referring to drawings.

Figure 1:
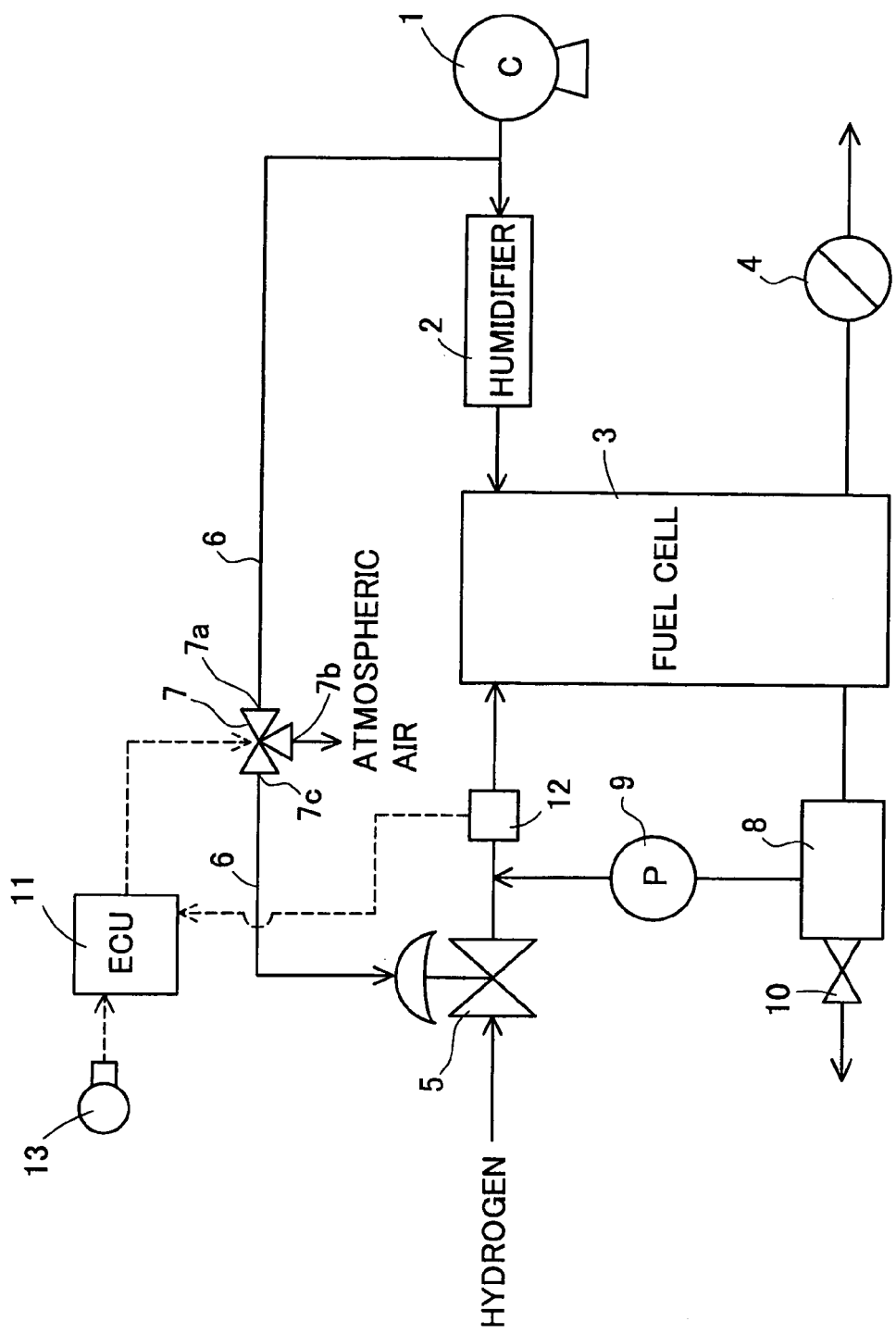
FIG. 1 is a structure diagram schematically showing fuel cell system directed to a first embodiment.

FIG. 1 shows a schematic structure diagram of fuel cell system including a gas decompression device directed to the embodiment. In the fuel cell system, air as oxidizing gas is recompressed to reach predetermined pressure level by a compressor 1. Recompressed air is humidified by a humidifier 2 and supplied to a fuel cell 3. Air supplied and used for generating electricity at the fuel cell 3 is exhausted as air-OFF gas from there and exhausted outside through a pressure control valve 4. The pressure control valve 4 controls air supply pressure at the fuel cell 3. In this fuel cell system, hydrogen gas as fuel gas is decompressed by a decompression valve 5 and supplied to the fuel cell 3. Flow rate of hydrogen gas (gas flow rate) supplied to the fuel cell 3 is detected by a flow rate sensor 12. The decompression valve 5 comprises a pneumatic proportional pressure control valve. Air supplied from the compressor 1 to the fuel cell 3 is converted into a pressure signal and the signal is inputted to the decompression valve 5. The decompression valve 5 decompresses pressure of hydrogen gas at its outlet (outlet pressure) to reach a predetermined range of pressure depending on the output signal. There is arranged an electric pressure switch valve 7 on an air path 6 which supplies compressed air from the compressor 1 to the decompression valve 5. A first port 7a, a second port 7b and a third port 7c of the pressure switch valve 7 communicate with the downstream side of the compressor 1, atmospheric air, and the decompression valve 5, respectively. A valve body is driven by an electromagnet, whereby the pressure switch valve 7 can switch between a pressure supply state for making the first port 7a and the third port 7c communicable and an air release state for making the second port 7b and the third port 7c communicable. The pressure switch valve 7 can switch the above two states alternately. The decompression valve 5 adjusts flow rate of hydrogen gas supplied to the fuel cell 3 depending on flow rate of air supplied to the fuel cell 3. After used for generating electricity at the fuel cell 3, hydrogen gas is exhausted from the fuel cell 3 as hydrogen-OFF gas. The exhausted hydrogen-OFF gas is delivered to a drain trap 8. Water included in the gas is separated in the drain trap 8, sacked by a pump 9, mixed with new hydrogen gas flowing out from the decompression valve 5 and supplied to the fuel cell 3 again. Water collected by the drain trap 8 is appropriately drained off by opening the purge valve 10. The pressure switch valve 7 and a flow rate sensor 12 are connected to an electric control unit (ECU) 11 for controlling the fuel cell system. The ECU 11 is connected to an ignition switch (IG/SW) 13 for starting-up/stopping the fuel cell system.

Figure 2:
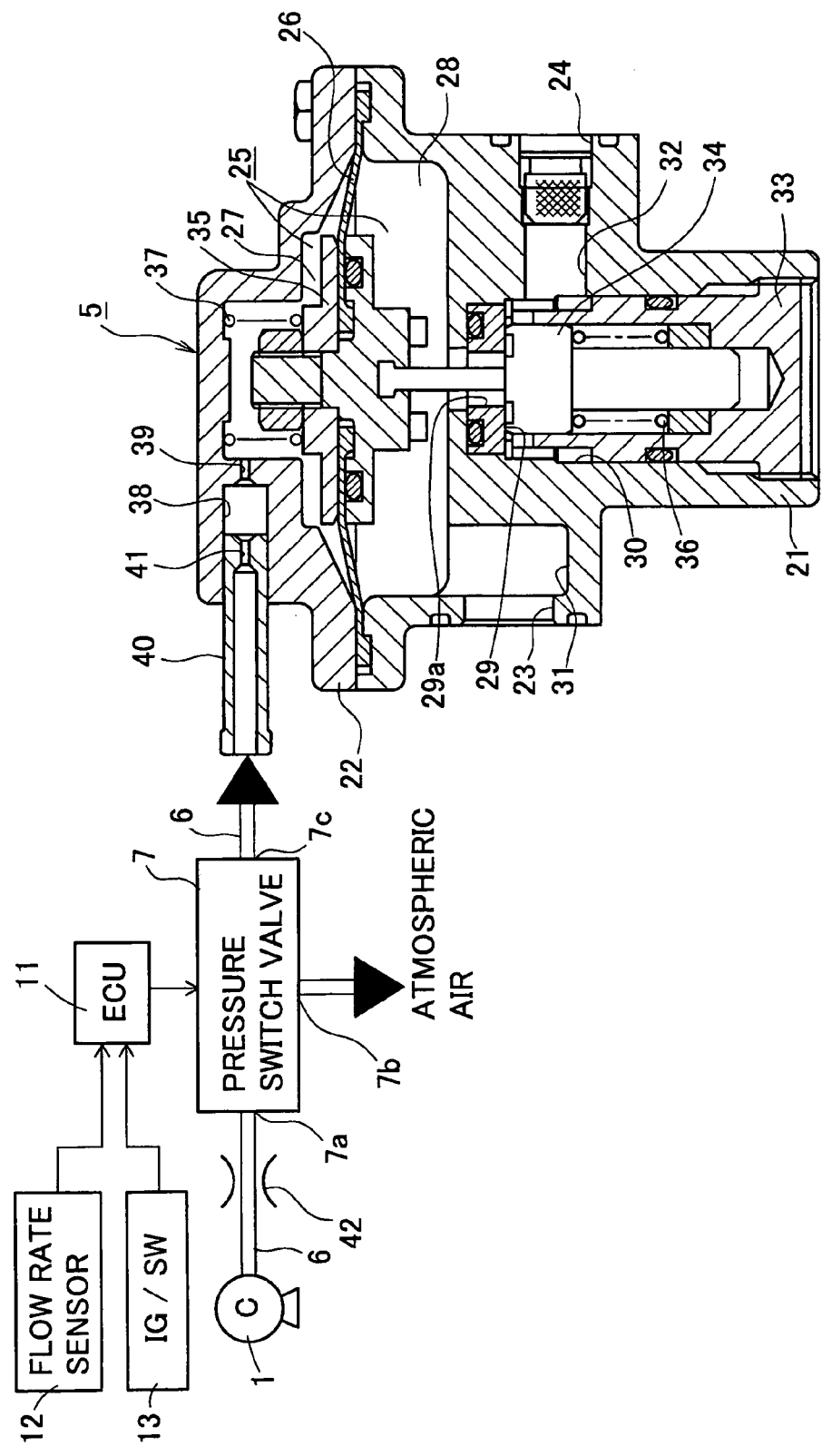
FIG. 2 is a structure diagram schematically showing a gas decompression device including a sectional view of a decompression valve.

FIG. 2 shows a schematic structure diagram of the gas decompression device including a sectional view of the decompression valve 5. The decompression valve 5 comprises a lower body 21 and an upper body 22 coupled together. An outlet 23 and an inlet 24 are arranged left and right of the lower body 21. An internal space 25 provided between the lower body 21 and the upper body 22 is divided into a back pressure room 27 at upper side and a measuring room 28 at lower side by a diaphragm 26. Periphery of the diaphragm 26 is held by the lower body 21 and the upper body 22.

Other than the outlet 23 and the inlet 24, the lower body 21 includes a valve seat 29 provided between the outlet 23 and the inlet 24, a valve chamber 30 adjoining to the valve seat 29, an outlet path 31 and an inlet path 32. The valve seat 29 has a valve port 29 in the center of it. The valve port 29a communicates with the outlet 23 through the measuring room 28 and an outlet path 31. The valve room 30 communicates with the inlet 24 through an inlet path 32. A valve body holder 33 is provided in the valve chamber 30. A valve body 34 for the valve seat 29 is arranged in on the valve body holder 33 for reciprocal action. When the valve body 34 comes to contact with the valve seat 29, a space between the inlet 24 and the outlet 23 is blocked. When the valve body 34 comes to apart from the valve seat 29, the inlet 24 and the outlet 23 communicate each other. A holder 35 arranged in the center of the diaphragm 26 is connected to the valve body 34. The valve body 34 is arranged interlocking with the diaphragm 26. Return springs 36 for urging the valve body 34 toward a direction to contact with the valve seat 29 are arranged on the valve body holder 33. In this embodiment, gas pressure acts on the diaphragm 26 in the measuring room 28, whereby the diaphragm 26 is displaced toward direction to make valve body 34 come closer to the valve seat 29.

In the back pressure room 27, pressure control springs 37 are provided between the upper body 22 and the holder 35. The pressure control springs 37 urge the diaphragm 26 in the direction of separating the valve body 34 from the valve seat 29. An air path 38 reaching the back pressure room 27 is formed in the upper body 22. An orifice 39 is provided in the air path 38. A tube joint 40 is attached to the inlet of the air path 38. An orifice 41 is provided for the tube joint 40. The pressure switch valve 7 and the compressor 1 are connected to the tube joint 40 through the air path 6. An orifice 42 is provided at the vicinity of the first port 7a for the pressure switch valve 7. The decompression valve 5 directed to this embodiment decompresses hydrogen gas flowing out from the outlet 23 by way of the inlet 24 and the measuring room 28 in a manner such that the valve body 34 is made to move from the valve seat 29 by collaboration of the diaphragm 26, the pressure control springs 37, and the return springs 36.

In this embodiment, when the pressure switch valve 7 is switched to a pressure supply state, air pressure corresponding to working pressure is supplied from the compressor 1 to the back pressure room 27 in the decompression valve 5 as back pressure. The back pressure helps to push the diaphragm 26 toward the direction same as urging force direction of the pressure control springs 37. Furthermore, when the pressure switch valve 7 is switched to an air release state, the back pressure room 27 in the decompression valve 5 is released to atmospheric air. Thereby, the back pressure in the back pressure room 27 is declined to atmospheric pressure level. Urging force of the pressure control springs 37 is adjusted by thus controlling back pressure supplied to the back pressure room 27. In this embodiment, the compressor 1 and the air path 6 constitute the inventive working pressure supply means for supplying working pressure to the back pressure room 27 in the decompression valve 5. Furthermore, the pressure switch valve 7 corresponds to the inventive working pressure adjust means for adjusting back pressure to be supplied to the back pressure room 27.

The flow rate sensor 12 corresponds to the inventive gas flow rate detect means for detecting gas flow rate at the outlet 23. The ECU 11 corresponds to the inventive control means for controlling the pressure switch valve 7 so as to adjust back pressure depending on gas flow rate detected by the gas flow rate sensor 12. Furthermore, the ignition switch 13 corresponds to the inventive stop detect means for detecting a stop of the fuel cell system. When a stop of the fuel cell system is detected, the ECU controls the pressure switch valve 7 so as to decline back pressure at the back pressure room 27 to atmospheric pressure level.

Figure 3:
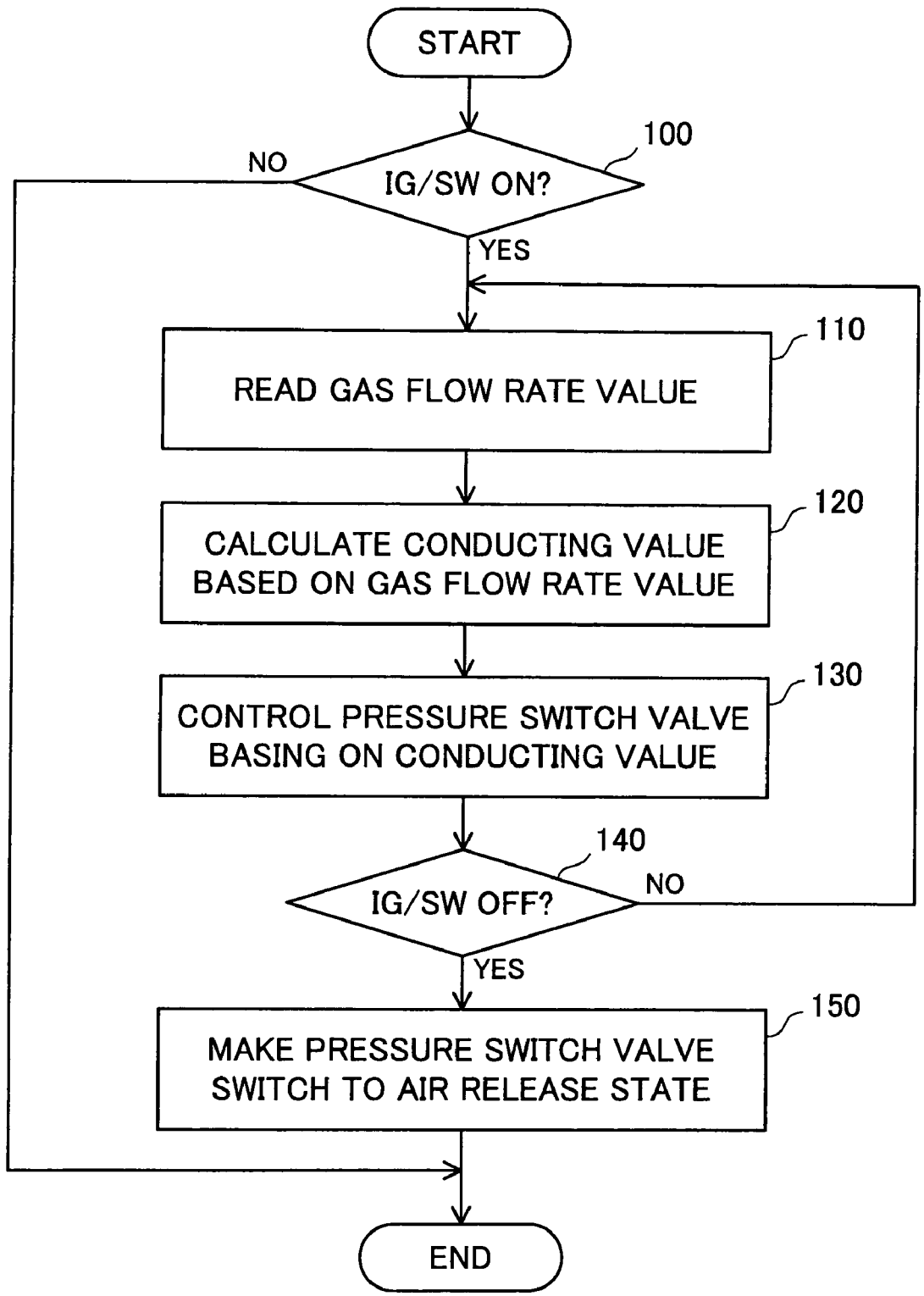
FIG. 3 is a flow chart of control program for the decompression valve.

FIG. 3 shows a flow chart of control program executed by the ECU 11 to control the decompression valve 5.

Firstly, in step 100, the ECU 11 judges whether or not the ignition switch (IG/SW) 13 is turned on. In case it is NO, the ECU 11 does not go on to following step but goes straight to the end of program. In case it is YES, the ECU 11 goes on to step 110.

In step 110, the ECU 11 reads a gas flow rate value detected by the gas flow rate sensor 12.

Figure 4:
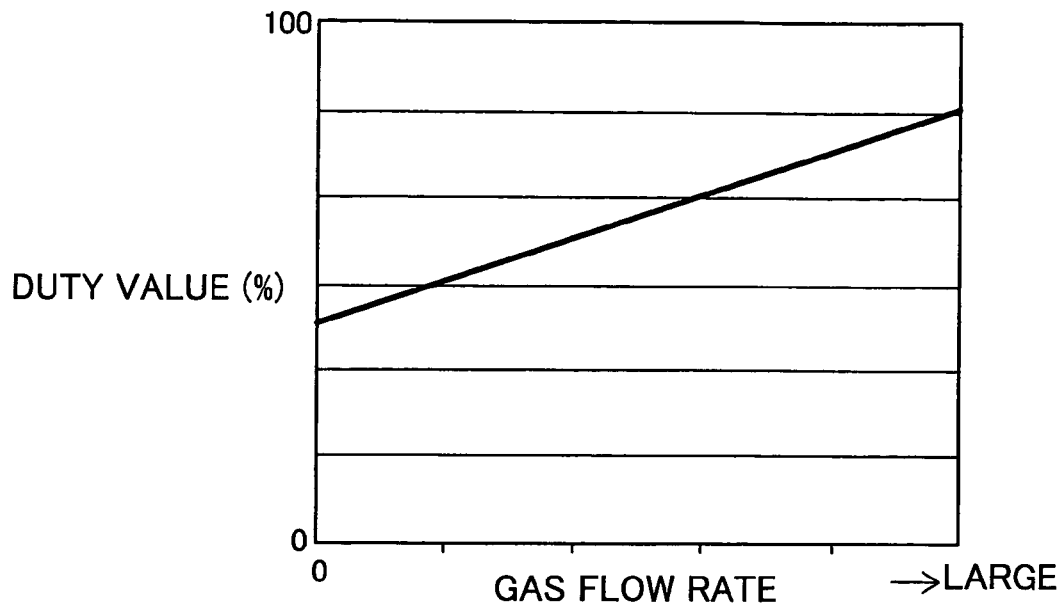
FIG. 4 is a map data showing relation of gas flow rate and duty value.
Figure 5:
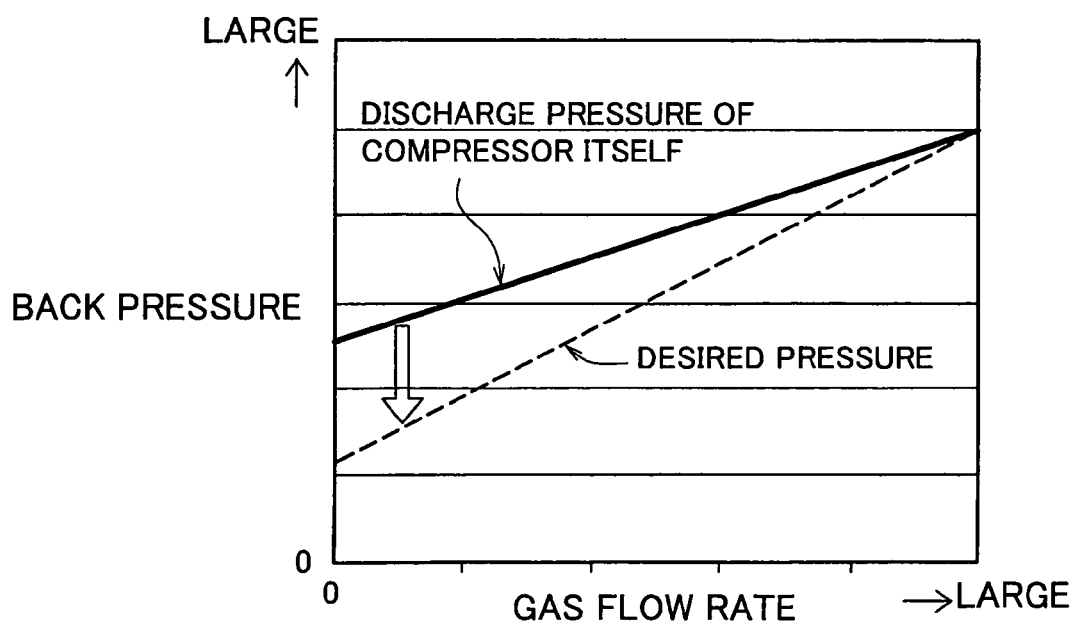
FIG. 5 is a graph showing relation of gas flow rate and back pressure.
Figure 6:
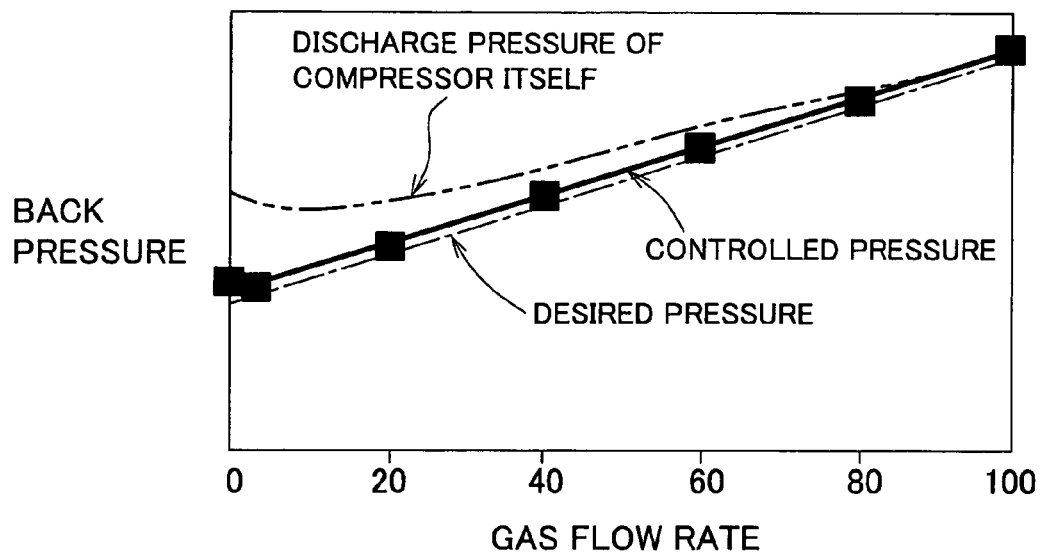
FIG. 6 is a graph showing relation of gas flow rate and back pressure.

Next, in step 120, the ECU 11 calculates a conducting value of the pressure switch valve 7 basing on the gas flow rate value. In this embodiment, conducting values optimum to respective gas flow rate values are previously set in map data format. The ECU 11 calculates an optimum conducting value by referring to the map data. In this embodiment, the pressure switch valve 7 switches between a pressure supply state and an air release state by means of duty control. Therefore, a duty value reflecting gas flow rate is calculated as a conducting value. In this embodiment, a duty value as conducting value is calculated by referring to the map data as shown in FIG. 4. By referring to the map data, characteristic of back pressure to be supplied to the back pressure room 27 in the decompression valve 5 can be made closer to desired pressure characteristic (broken line) from discharge pressure characteristic of the compressor 1 itself (solid line), as shown in FIG. 5. That is, as shown in FIG. 6, change characteristic of back pressure reflecting gas flow rate (controlled pressure) can be made closer to desired pressure characteristic (alternate long and short dash line) from "discharge pressure characteristic of compressor 1 itself" (alternate long and two short dashes line).

Next, the ECU 11 controls the pressure switch valve 7 basing on a calculated conducting value (duty value) in step 130.

After that, the ECU 11 judges whether or not the ignition switch (IG/SW) 12 is turned OFF in step 140. In case it is NO, processing returns to step 110. In case it is YES, the ECU 11 makes the pressure switch valve 7 switch to an air release state in step 150 and following processing is once stopped.

According to the above described gas compression device directed to the present embodiment, hydrogen gas pressure acts on the diaphragm 26 in the measuring room 28, whereby the diaphragm 26 is displaced toward direction to make the valve body 34 close to the valve seat 31. On the other hand, back pressure is supplied to the back pressure room 27 by the compressor 1. The back pressure acts on the diaphragm 26, whereby the diaphragm 26 is displaced toward direction to make the valve body 34 separate from the valve seat 31. Similarly, urging force of the pressure control spring 37 urges the diaphragm 26 toward direction to make the valve body 34 separate from the valve seat 31. The back pressure, gas pressure, and urging force are balanced and the diaphragm 26 is displaced, whereby distance of the valve seat 31 and the valve body 34, i.e., opening of the valve body 34, is determined. As the opening is larger, the pressure control springs 37 are transformed more and urging force of the pressure control springs 37 becomes smaller in accordance with a spring constant. As a result, gas pressure at the outlet 23 acting on the diaphragm 26 declines.

As opening of the valve body 34 becomes larger, gas flow rate flowing out from the outlet 23 becomes large. The flow rate sensor 12 detects the gas flow rate at the outlet 23. Conductivity control of the pressure switch valve 5 is made by the ECU 11 depending on a detected value, whereby back pressure to be supplied to the back pressure room 27 is adjusted. Accordingly, force in direction same as urging force direction of the pressure control springs 37 is applied to the diaphragm 26, whereby force acting on the diaphragm 26 is made constant and gas pressure at the outlet 23 is kept constant. As a result, hydrogen gas pressure supplied to the fuel cell 3 can be kept constant. Thus constant pressure of hydrogen gas can be supplied to the fuel cell 3 even though gas flow rate changes. Therefore, the fuel cell 3 can exhibit good performance.

Figure 7:
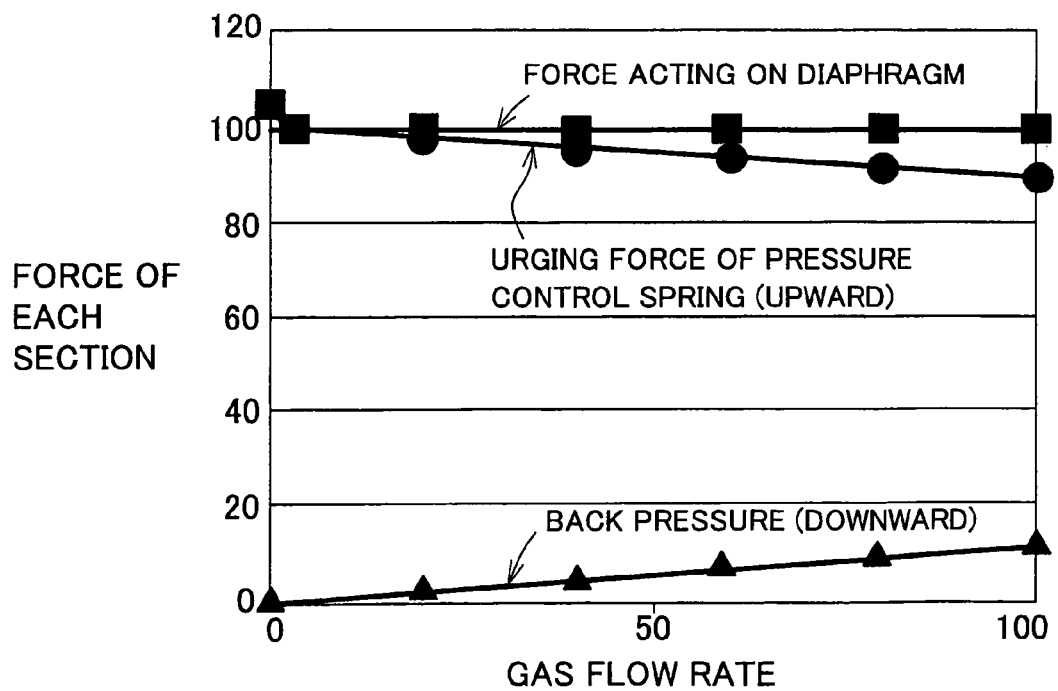
FIG. 7 is a graph showing relation of gas flow rate and force of each section.

FIG. 7 is a graph showing relation of gas flow rate and force of each section. As apparent from the graph, urging force of the pressure control springs 37 decreases from "100" to "90" as gas flow rate increases from "0" to "100". Along with change of the urging force, back pressure in direction same as the urging force direction is applied to the diaphragm 26. In this embodiment, as shown in FIG. 7, as gas flow rate increases from "0" to "100", back pressure is set to increase from "0" to "10" gradually. That is, when gas flow rate is "0", back pressure is "0", a minimum value, and as the gas flow rate reaches "100", a maximum value, back pressure is set to "10". By the back pressure, resultant force acting on the diaphragm 26 is adjusted to "100", a constant value. As a result, hydrogen gas pressure at the outlet 23 in the decompression valve 5 does not change in response to change of flow rate of gas flowing from the outlet 23.

Furthermore, according to the gas decompression device directed to this embodiment, when a stop of the fuel cell system is detected by the ignition switch (IG/SW) 13, the pressure switch valve 7 is controlled by the ECU 11 so as to make back pressure supplied to the back pressure room 27 lower to atmospheric level. Accordingly, when the fuel cell system stops, force acting on the diaphragm 26 in the decompression valve 5 becomes small immediately and gas pressure at the outlet 23 declines immediately. As a result, there can be reduced pressure of hydrogen gas working on the fuel cell 3 when the fuel cell system stops. Since pressure of hydrogen gas can be reduced when the fuel cell system stops, severe pressure proof design of the fuel cell 3 is not required. Therefore, this aspect contributes to miniaturization and durability extension of the fuel cell 3.

Figure 8:
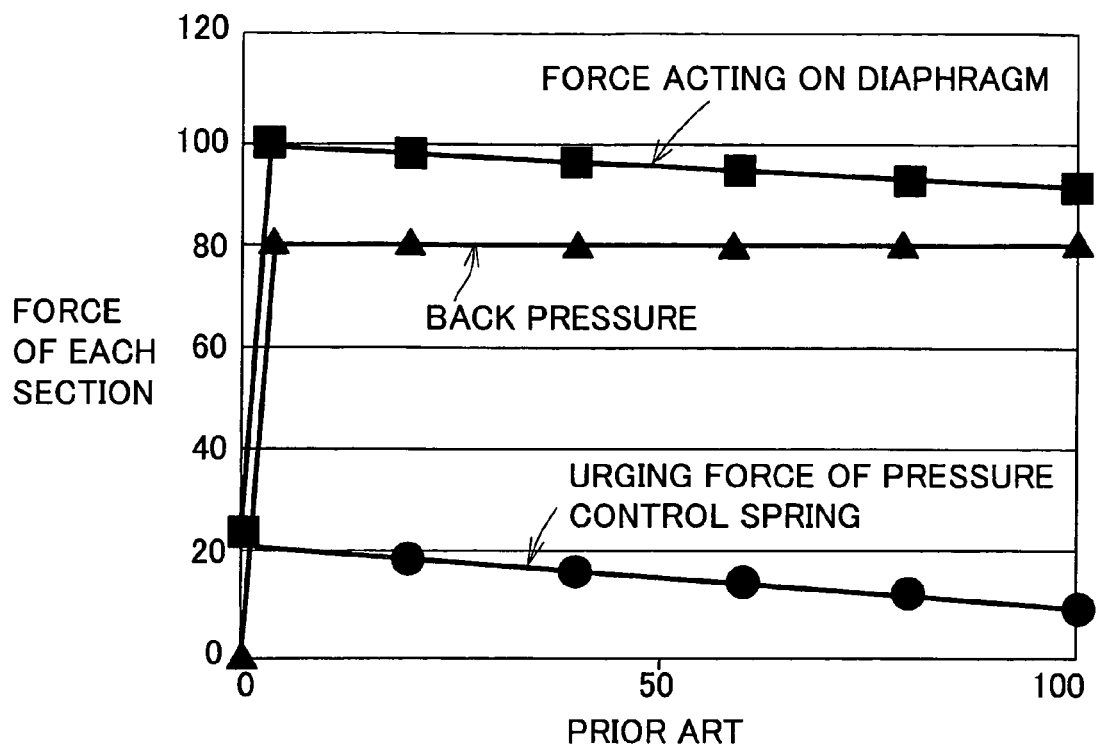
FIG. 8 is a graph showing relation of gas flow rate and force of each section.
Figure 9:
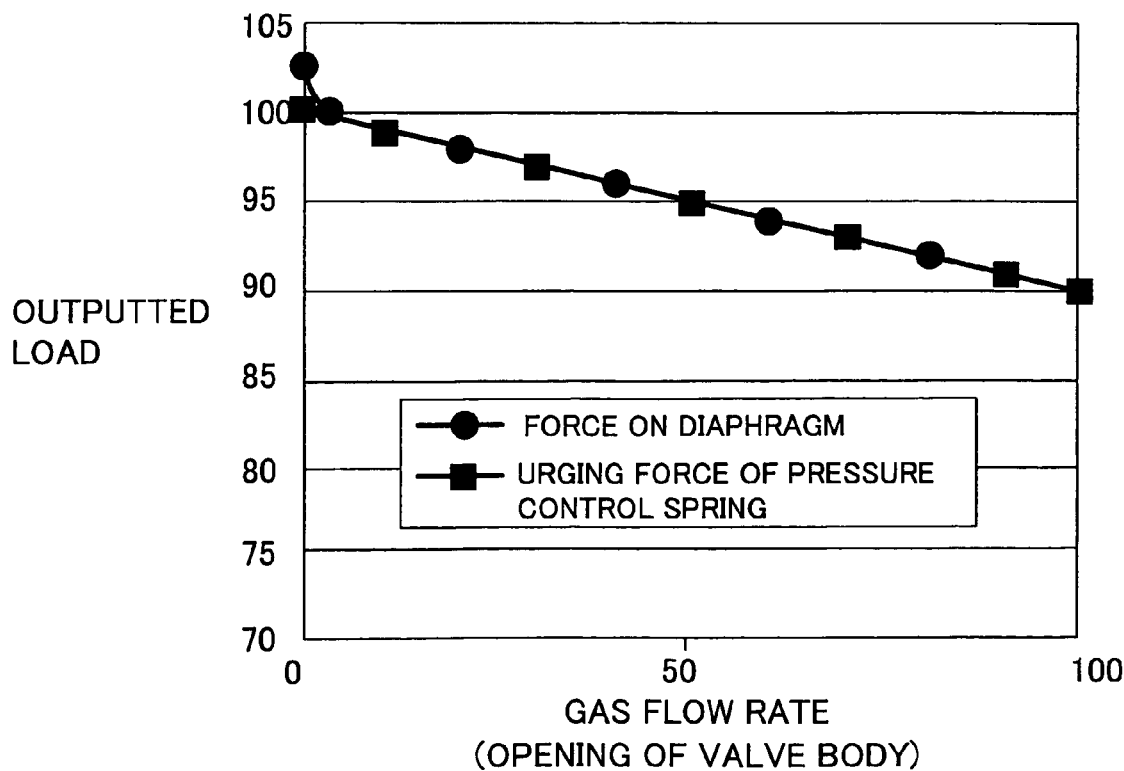
FIG. 9 is a graph showing relation of gas flow rate and output load.
Figure 10:
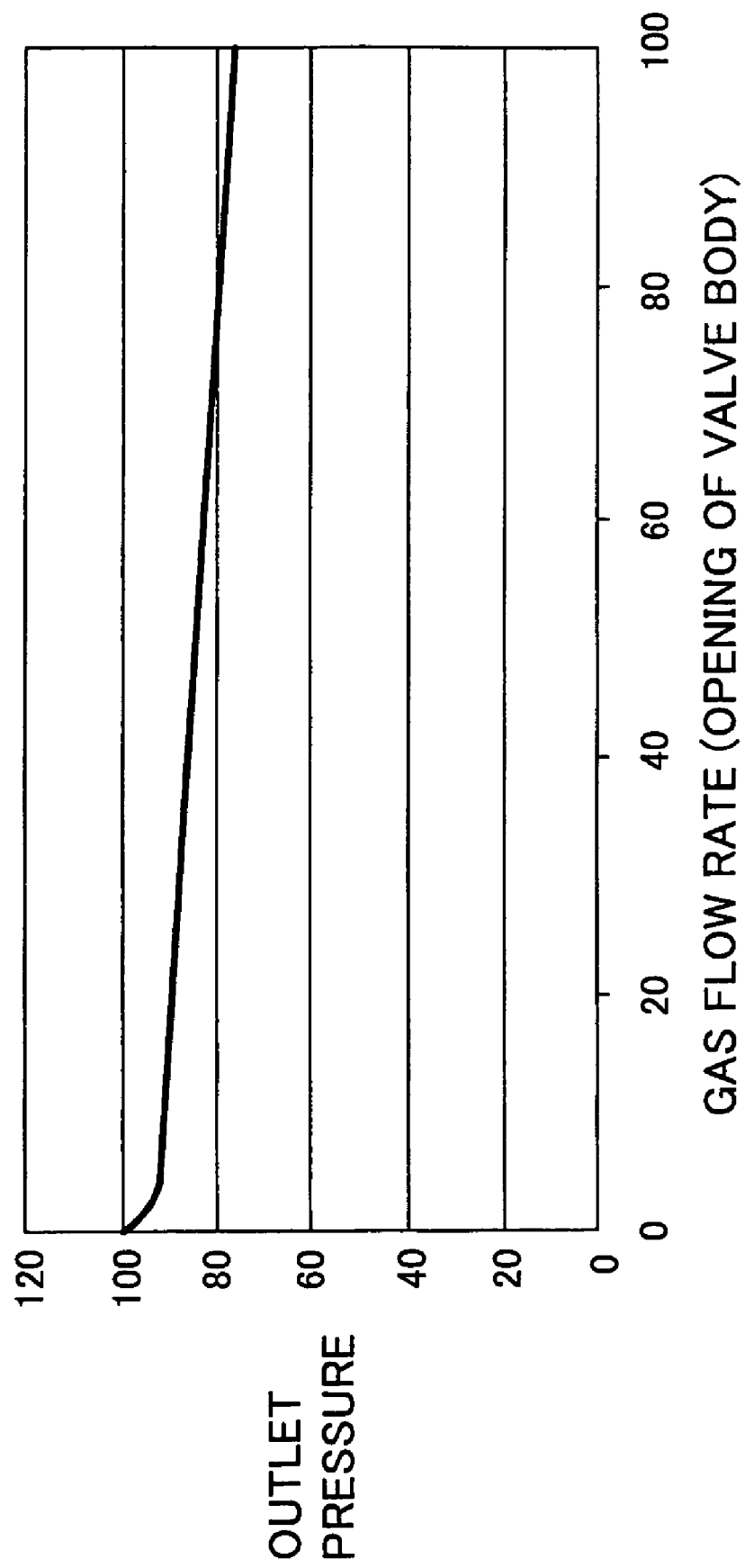
FIG. 10 is a graph showing relation of gas flow rate and outlet pressure.

FIG. 8 is a graph showing relation of gas flow rate and force of each section. In an experiment directed to the graph of FIG. 8, different from the case of FIG. 7, control of back pressure in response to change of gas flow rate is not conducted for the sake of convenience. Only when the valve body 34 is totally enclosed (i.e., when gas flow rate is "0"), back pressure is set to "0" (i.e., atmospheric pressure level) by making the pressure switch valve 7 switch to an air release state for introducing atmospheric pressure to the back pressure room 27. As apparent from the graph, back pressure is set to "0" when gas flow rate is "0", whereby force acting on the diaphragm 26 lowers immediately. As a result, pressure of hydrogen gas at the outlet 23 of the decompression valve 5 can be lowered immediately.

The present invention is not limited to the embodiment described above and may of course be improved or modified in various manners within the scope and spirit of the present invention.

In the above-mentioned embodiment, the inventive gas decompression device is used for decompressing hydrogen gas to be supplied to the fuel cell 3 in the fuel cell system. It is also possible to use the inventive gas decompression device for decompressing air to be supplied to a fuel cell in fuel cell system.

In the above-mentioned embodiment, the flow rate sensor 12 for detecting gas flow rate is used as gas flow rate detect means. It is also possible to use an opening sensor or the like for detecting "opening of valve" corresponding to gas flow rate as gas flow rate detect means.

What is claimed is:

1. A gas decompression device which decompresses gas to be supplied to a fuel cell in fuel cell system, the gas decompression device comprising:
   a body which includes an inlet, an outlet, and an internal space;
   a diaphragm which divides the internal space into a measuring room and a back pressure room;
   a valve seat which is provided for the measuring room and arranged between the inlet and the outlet;
   a valve body which is provided for the valve seat and interlocked with the diaphragm;
   working pressure supply means which supplies working pressure to the back pressure room;
   a pressure control spring which urges the diaphragm in a direction to make the valve body separate from the valve seat;
   working pressure adjust means which adjusts working pressure to be supplied to the back pressure room;
   gas flow rate detect means which detects flow rate of gas from the outlet or a value corresponding to the flow rate;
   stop detect means which detects a stop of the fuel cell system, wherein the control means controls the working pressure adjust means so as to lower the working pressure to atmospheric pressure level when a stop of the fuel cell system is detected by the stop detect means; and
   control means which controls the working pressure adjust means so as to adjust the working pressure depending on the flow rate or the value corresponding to flow rate detected by the gas flow rate detect means,
   wherein
   the diaphragm is displaced in a direction to make the valve body come close to the valve seat when gas pressure works on the measuring room side of the diaphragm,
   the diaphragm is displaced in a direction to make the valve body separate from the valve seat when working pressure works on the back pressure room side of the diaphragm, and
   gas flowing in the measuring room through the inlet and out from the outlet is decompressed by such that collaboration of at least the diaphragm and the pressure control spring makes the valve body move with reference to the valve seat.

2. The gas decompression device according to claim 1, wherein the working pressure supply means includes a compressor for compressing air and an air path for supplying working pressure, namely, air compressed by the compressor, to the back pressure room.

3. The gas decompression device according to claim 2, wherein the working pressure adjust means includes a pressure switch valve and the pressure switch valve switches states between a pressure supply state for supplying air pressure to the back pressure room and an air release state for releasing air pressure to the back pressure room.

4. The gas decompression device according to claim 3, wherein the control means is an electronic control unit for controlling the pressure switch valve.

5. The gas decompression device according to claim 1, wherein gas flow rate detect means is a flow rate sensor which detects flow rate of gas to be supplied to the fuel cell.

6. A gas decompression device which decompresses gas to be supplied to a fuel cell in fuel cell system, the gas decompression device comprising:
   a body which includes an inlet, an outlet, and an internal space;
   a diaphragm which divides the internal space into a measuring room and a back pressure room;
   a valve seat which is provided for the measuring room and arranged between the inlet and the outlet;
   a valve body which is provided for the valve seat and interlocked with the diaphragm;
   a compressor which compresses air;
   an air path which supplies working pressure derived from air compressed by the compressor;
   a pressure control spring which urges the diaphragm in a direction to make the valve body separate from the valve seat;
   a pressure switch valve which is arranged on the air path so as to adjust working pressure to be supplied to the back pressure room and switches states between a pressure supply state for supplying air pressure to the back pressure room and an air release state for releasing air pressure to the back pressure room;
   a flow rate sensor which detects flow rate of gas from the outlet; and
   an ignition switch which detects a stop of the fuel cell system, wherein the electronic control unit controls the pressure switch valve to switch to the air release state so as to lower the working pressure to atmospheric pressure level when a stop of the fuel cell system is detected by the ignition switch; and an electronic control unit which controls the pressure switch valve so as to adjust the working pressure depending on detected gas flow rate, wherein the diaphragm is displaced in a direction to make the valve body come close to the valve seat when gas pressure works on the measuring room side of the diaphragm, the diaphragm is displaced in a direction to make the valve body separate from the valve seat when working pressure works on the back pressure room side of the diaphragm, and gas flowing in the measuring room through the inlet and out from the outlet is decompressed by such that collaboration of at least the diaphragm and the pressure control spring makes the valve body move with reference to the valve seat.

7. The gas decompression device according to claim 6, wherein the electronic control unit reads a gas flow rate value detected by the flow rate sensor after start-up of the fuel cell system, calculates a conducting value of the pressure switch valve basing on the gas flow rate value read, and controls the pressure control value basing on the conducting value calculated.

8. The gas decompression device according to claim 7, wherein the electronic control unit calculates the conducting value basing on the gas flow rate value detected by referring to predetermined map data which sets relation of optimum conducting values for respective gas flow rate values.

9. The gas decompression device according to claim 8, wherein the electronic control unit controls the pressure switch valve's switching states between the pressure supply state and the air release state in a manner of duty control, and the conducting value is a duty value directed to the duty control.

* * * * *